April 28, 1964 B. E. A. H. BEESKOW 3,130,827
CLUTCH CONTROL SYSTEM
Filed Feb. 8, 1960 2 Sheets-Sheet 1
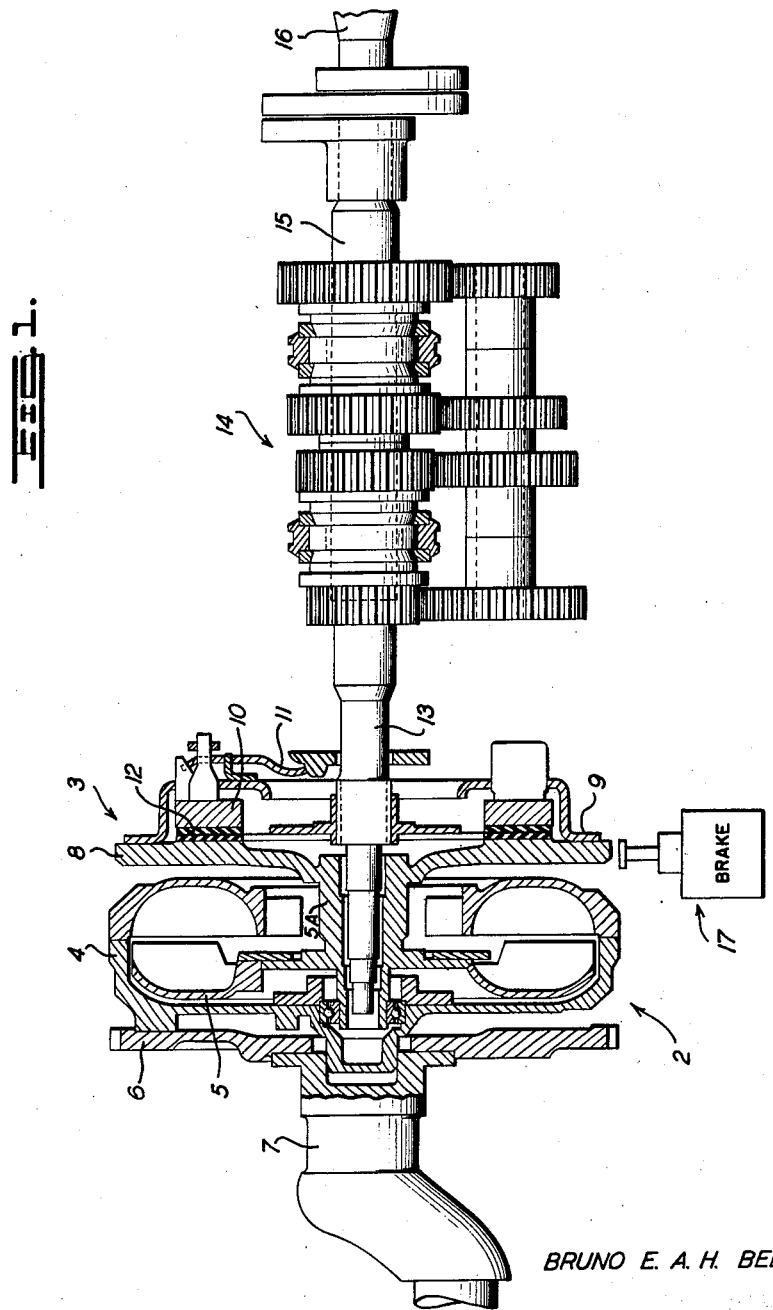
INVENTOR
BRUNO E. A. H. BEESKOW
BY *Dicke, Craig & Freudenberg*
ATTORNEYS April 28, 1964 B. E. A. H. BEESKOW 3,130,827
CLUTCH CONTROL SYSTEM
Filed Feb. 8, 1960 2 Sheets-Sheet 2
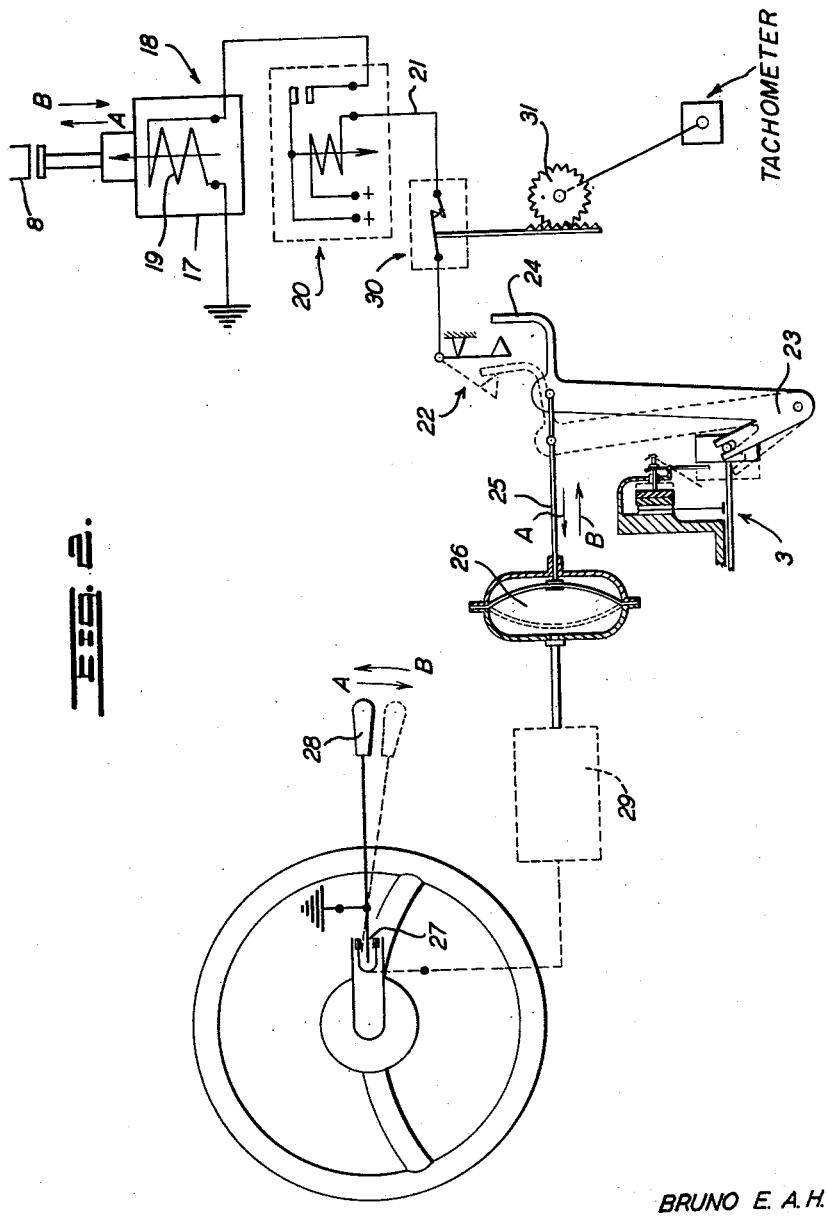
INVENTOR
BRUNO E. A. H. BEESKOW
ATTORNEYS

United States Patent Office 3,130,827
Patented Apr. 28, 1964

3,130,827
CLUTCH CONTROL SYSTEM
Bruno E. A. H. Beeskow, Stuttgart-Bad, Cannstatt, Germany, assignor to Daimler-Benz Aktiengesellschaft, Stuttgart-Unterturkheim, Germany
Filed Feb. 8, 1960, Ser. No. 7,358
Claims priority, application Germany Feb. 14, 1959
10 Claims. (Cl. 192—13)

The present invention relates to a clutch for motor vehicles, especially to an automatic clutch system for motor vehicles, consisting essentially of a hydrodynamic coupling or of a centrifugally actuated clutch constituting the starting clutch and of a mechanical separating clutch operative during shifting of a change-speed transmission connected to the output thereof.

Automatic clutch control systems with a starting clutch of the type mentioned hereinabove are known to the prior art. Furthermore, it is known in the prior art to coordinate or assign different engaging speeds in the mechanical separating clutch to the torque to be transmitted, in order to avoid a slippage of the separating clutch, for example, during accelerations of the engine immediately after shifting of the speed.

In the prior art automatic clutch control systems comprising a fluid coupling or hydrodynamic starting clutch and a mechanical separating clutch, there are certain inherent disadvantages among which may be mentioned the inertia shock occurring in the mechanical clutch after engagement of a speed from a standstill during relatively rapid acceleration of the engine. This is caused by the fact that as a result of the increased moment in the hydrodynamic starting clutch, the driven part thereof and therewith the driving part of the separating clutch rigidly connected thereto already rotate and, therefore, different inertia moments have to be clutched in the shortest time by the separating clutch. The mass of the secondary part of the starting clutch or coupling and of the driving part of the mechanical separating clutch, accelerated by the engine, has to be coupled, therefore, with or clutched to the stationary mass of the driven part of the mechanical separating clutch and of the torque-transmitting train of elements leading through the change-speed gear to the driven wheels.

If no immediate acceleration takes place after engagement of a speed during the starting operation, then only a relatively small residual torque is present in the hydrodynamic starting coupling. The small inertia moment of the secondary part of the starting coupling may be absorbed during engagement of the mechanical separating clutch by the latter and the engine is now accelerated subsequently without the occurrence of any inertia shocks.

The clutches or couplings of the present invention are so constructed as to eliminate the disadvantages referred to, such elimination being brought about by various constructional features including the braking of the driving member of the mechanical clutch, which in accordance with the invention is connected with the driven part of the starting fluid clutch or coupling.

Such braking has the effect of eliminating objectionable inertia shocks occurring during engagement of the mechanical clutch, both parts of the mechanical clutch thus being at a standstill. The accelerating shock of the engine caused by rapid depressing of the gas pedal during starting is now effectively absorbed by a correspondingly larger slippage between the driving and driven part of the hydrodynamic coupling or centrifugally actuated starter clutch, such driven part, as before said, being connected to the driving member of the mechanical starting clutch.

Since the brake mechanism in accordance with the present invention is to be operative only during starting of the vehicle, a control member is coordinated to or operatively connected with—according to the present invention—the brake for the driving part of the mechanical separating clutch which blocks or prevents the actuation of the brake above a predetermined relatively low vehicle speed. The braking may thereby take place in such a manner that a centrifugal brake or a friction brake, for example, a band brake is arranged at the driving part of the separating clutch and that for actuation thereof, a magnet is operatively connected with or coordinated to this brake which is controlled by the separating clutch itself or by the actuating thereof over corresponding suitably constructed engaging means.

The control of the brake means, effective only during starting operation of the vehicle, may take place, in accordance with one embodiment of the present invention, in dependence on the generator of the driving engine of the vehicle. According to another embodiment of the present invention, the magnet may be controlled over a relay while a switch may be arranged as actuating device in the energizing circuit of the relay closing during energization thereof, which closes during opening of the separating clutch and which opens again in the last part or stage of the clutch stroke during closing of the separating clutch. A further switch effective as a control member and adapted to open at a predetermined vehicle speed, for example, actuated by the tachometer or a rotary speed responsive means may be connected in series with the switch adapted to be automatically connected by the clutch itself.

This type of control has the advantage that the brake mechanism may also find use as a creeping brake for the vehicle and becomes operative independently of the rotary speed of the engine.

Accordingly, it is an object of the present invention to provide a control system and, more particularly, an automatic control system for the actuation of a separating clutch in which clutch shocks are completely eliminated when accelerating the vehicle rapidly from standstill immediately after engagement of a speed.

Another object of the present invention is the provision of an automatic control system for use with a transmission including a starting clutch or coupling and a mechanical separating clutch adapted to separate the starting clutch or coupling from the mechanical change-speed gear during shifting from one speed to another, which control system is so constructed as to assure avoidance of the shocks that may occur in the separating clutch when accelerating the vehicle from standstill after engagement of a speed.

A further object of the present invention resides in the provision of a brake mechanism operative to brake the driving part of the mechanical separating clutch interposed between a hydraulic coupling or a centrifugally actuated starting clutch and the mechanical change-speed gear which brakes automatically the driving part of the mechanical separating clutch during disengagement thereof and during standstill of the vehicle.

A further object of the present invention is the provision of an automatic clutch control system which effectively eliminates any clutching shocks that may occur in the separating clutch during acceleration of the vehicle from standstill while, at the same time, effectively constituting an anti-creep brake to prevent creeping movement of the vehicle with the engine idling during standstill of the vehicle.

These and other objects, features and advantages of the present invention will become more obvious from the following description, when taken in connection with the accompanying drawing which shows, for purposes of illustration only, one embodiment in accordance with the present invention and wherein—

FIGURE 1 is a somewhat schematic longitudinal cross-sectional view through a transmission operative with an automatic clutch control system in accordance with the present invention, and FIGURE 2 is a schematic diagram of the control system for the brake mechanism used in connection with the automatic control system for the separating clutch in accordance with the present invention.

Referring now to the drawing, wherein like reference numerals are used throughout the two views to designate corresponding parts and, more particularly to FIGURE 1, the automatic clutch control system illustrated therein includes a hydrodynamic starting coupling generally designated by reference numeral 2, and a mechanical separating clutch generally designated by reference numeral 3 and operatively connected behind the starting coupling 2. The hydrodynamic starting coupling 2 is composed, in a manner known per se, of a primary member or impeller 4 and of a secondary member or turbine 5. The primary part 4 is directly connected with the engine crankshaft 7 through the flywheel 6. The secondary part 5 of the hydrodynamic coupling 2 is rigidly connected by sleeve 5a with the driving part 8 of the mechanical separating clutch 3 so as to rotate in unison therewith. The driving part 8 of the mechanical separating clutch is formed by the clutch housing 9 thereof provided with the pressure disc 10 and the engaging mechanism 11 (clutch throw-out levers). The driven part of the separating clutch 3 essentially consists of the clutch disc 12 which is arranged directly on the input shaft 13 of a mechanical change-speed gear generally designated by reference numeral 14 of which is operatively connected therewith in any other suitable, known manner. The output shaft 15 of the change-speed gear 14 is operatively connected, in a manner known per se, with the cardan shaft 16 for the vehicle drive.

A brake generally designated by reference numeral 17 is adapted to be coordinated to or operatively connected with the driven part 5 of the starting clutch or coupling 2 since part 5 is rigidly connected with the driving part 8 which is disposed adjacent brake 17 in a position enabling part 8 to be braked thereby. The parts 5 and 8 may, therefore, be non-rotatably braked by means of brake 17 with respect to the housing or any other relatively fixed part of the vehicle. The brake 17 is appropriately constructed as a friction or centrifugal brake, for example, as a band brake, and is preferably arranged at the hollow clutch housing 9 of the separating clutch 3. The brake 17 is actuated, i.e. engaged by means of an electromagnet, whereas the disengagement thereof takes place, for example, by a spring force; the engagement and control of brake 17 will be described more fully hereinafter. However, a construction of brake 17 as a centrifugally actuated brake of conventional construction is also within the scope of the present invention.

It is possible, by means of brake 17, to keep the driven part 5 of the starting clutch or coupling 2 and the driving part 8 of the separating clutch 3 stationary in order to avoid any shocks in the separating clutch 3 during engagement thereof after engagement of a speed from standstill of the vehicle. An electromagnet generally designated by reference numeral 18 is provided for the actuation of the brake 17, as illustrated in FIGURE 2, the armature of which attracts the brake as soon as the control winding 19 thereof is energized. A control relay generally designated by reference numeral 20 is arranged in the energizing circuit of the magnet 18, which relay 20 is of the type closing upon energization thereof. A switch generally designated by reference numeral 22, which is normally opened during engagement of the separating clutch 3, is arranged in the energizing circuit 21 of the control relay 20. The disengaging switch 22 is operatively connected with the separating clutch 3 and is actuated, for example, by the clutch disengaging lever 23 by means of projection 24 thereof or the like. The clutch disengaging lever 23 may thereby form itself a contact of switch 22. The operative connection of switch 22 with the clutch disengaging lever 23 thereby takes place in such a manner that during opening of separating clutch 3, the switch 22 is closed and that during closing of the separating clutch 3, it will be opened and, more particularly, only during that last part or stage of the clutch stroke thereof. The clutch disengaging lever 23 is automatically actuated by a pull rod 25 from the servomotor 26 which, in turn, is controlled, in accordance with movement of the engaging switch 27 at the speed shifting lever 28 by a control element 29 and appurtenant parts of a system such as disclosed in the patent to Binder, 2,891,640.

A further switch 30 is arranged in series with the disengaging switch 22 which forms a control member and which is operatively connected through an endwise movable toothed rack member actuated by a toothed transmission element 31 with the tachometer of the vehicle or with a rotational speed-responsive device responsive to the vehicle speed. This switch is connected to the rack member and in response to an appropriate endwise movement of the latter is opened above a certain relatively low vehicle speed, for example, above a speed of 8 km. per hour. The switch thereby renders possible the control and safety feature that brake actuation of brake 17 can take place only during a standstill of the vehicle or during creeping speeds thereof; however, never while the vehicle is driven and, for example, during shifting or engagement of a higher speed.

If, during standstill of the vehicle, for example, first speed is engaged by means of shifting lever 28, then the switch 27 is closed and the pull rod 25 is moved in the direction of the arrow A over control element 29 and by means of the vacuum prevailing in the servomotor 26, whereby the mechanical separating clutch 3 is opened. After a relatively small movement of the pull rod 25, the switch 22 is effectively closed thereby. Since the switch 30 is closed during standstill of the vehicle, the energizing circuit of the relay 20 is thereby also closed. As a result thereof, the relay 20 is energized and thereby closes its contacts resulting in a closure of the energizing circuit for the magnet 18 so that the latter is energized and attracts the armature thereof and therewith engages the brake 17. As a result thereof, the secondary part 5 of the starting clutch or coupling 2 together with the driving part 8 of the separating clutch 3, which up to that time were rotating by reason of the residual torque, become stationary. After the engagement of first speed, the clutch disc 12 also is stationary so that during engagement of the separating clutch 3 only two relatively stationary parts have to be connected with each other. If, after engagement of the speed, the switch 27 is opened as a result of the release of the shifting lever 28, then the separating clutch 3 is engaged by means of control element 29 and servomotor 26 which actuate now the pull rod 25 in the direction of arrow B. This engagement of clutch 3, however, takes place without any shocks, as both clutch parts of the separating clutch 3 are now stationary. Even if the gas pedal is depressed to accelerate the vehicle immediately after engagement of the speed, no shock can occur as a result of the braking of the secondary part of the starting clutch 2.

As soon as the projection 24 of the disengaging lever 23 leaves switch 22, the latter opens as a result thereof. Consequently, the relay 20 and therewith the magnet 18 are deenergized and the braking action of the brake mechanism 17 is discontinued. The switch 30 opens above a predetermined vehicle velocity of the motor vehicle and therewith prevents brake actuation during shifting while the vehicle is driven above a predetermined, relatively low speed.

While I have shown and described one embodiment in accordance with the present invention, it is understood that the same is not limited thereto but is susceptible of many changes and modifications within the spirit and scope of the present invention. For example, it is also feasible to control the brake directly from switch 27 arranged at the shifting lever 28, provided, however, such delay mechanism is then so disposed that the brake is disengaged only upon closure or engagement of the separating clutch 3. This delay may be achieved thereby in any suitable manner, for example, by electric storage devices, such as condensers. Appropriately, the switch 22 may also be adjustable with respect to the disengaging lever 23 in order to accurately match the effect of both parts with respect to each other.

Thus, it is quite clear that the present invention is susceptible of many changes and modifications within the spirit and scope of the present invention and I, therefore, do not wish to be limited to the details shown and described herein but intend to cover all such changes and modifications as are encompassed by the scope of the appended claims.

I claim:

1. An automatic clutch control system for motor vehicles having starting coupling means and separating clutch means adapted to effectively disconnect a mechanical change-speed gear from said starting coupling means, each of said means having a driving and driven part, comprising means for selectively engaging and disengaging said driving and driven parts of said separating clutch means, means interconnecting the driving part of said separating clutch means and the driven part of said starting coupling means for common rotation together, and brake means for the two parts consisting of the driven part of said starting coupling means and of the driving part of said separating clutch means, said brake means being effective to brake said parts during engagement of said separating clutch means to thereby prevent any clutching shocks in said separating clutch means during acceleration of the vehicle from a standstill thereof, electrical actuating means for said brake means, means including an energizing circuit for energizing said electrical actuating means, and means including switch means in said energizing circuit for preventing the energization of said electrical actuating means above a predetermined, relatively low vehicle speed.

2. An automatic clutch control system according to claim 1, wherein said brake means is a friction brake adapted to engage the said driving part of said separating clutch means, said electrical actuating means comprising electromagnetically controlled means for engaging said friction brake in dependence on the actuation of said separating clutch means.

3. A clutch control system for vehicles having starting coupling means and separating clutch means adapted to effectively disconnect the load connected to said separating clutch means from said starting coupling means, each of said means having at least a driving and driven part, comprising means for selectively engaging and disengaging said driving and said driven parts of said separating clutch means, means interconnecting the driving part of said separating clutch means and the driven part of said starting coupling means for common rotation, and brake means for said two last-named parts, said brake means comprising a friction brake, electrical actuating means for engaging said friction brake, and means operatively connecting said electrical actuating means with said separating clutch means to selectively engage and disengage said brake means in dependence on the actuation of said separating clutch means, said means operatively connecting said electrical actuating means with said separating clutch means including switch means actuated by said separating clutch means for controlling said electrical actuating means.

4. A clutch control system according to claim 3, wherein said electrical actuating means includes electromagnetic means for selectively engaging and disengaging said brake means said means operatively connecting said electrical actuating means with said separating clutch means further including an energizing circuit for said electromagnetic means.

5. A clutch control system according to claim 4, further comprising switch means in said energizing circuit for effectively preventing engagement of said brake means in response to the vehicle speed above a predetermined relatively low speed.

6. A control system according to claim 5, further comprising speed responsive means proportional to the speed of the vehicle for opening said switch means above said predetermined speed.

7. A clutch control system according to claim 2, further comprising further switch means in said energizing circuit operatively connected with said separating clutch means so as to close said further switch means upon disengagement of said separating clutch means and to open said further switch means during the last stage of movement of said means for selectively engaging and disengaging said driving and said driven parts in clutch-engaging direction.

8. A clutch control system according to claim 7, further comprising servo means for said separating clutch means for engaging and disengaging said separating clutch means, and wherein said further switch means is operatively connected with said servo means.

9. A clutch control system according to claim 7, wherein said separating clutch means includes a disengaging lever, and wherein said further switch means is operatively connected with said disengaging lever.

10. A clutch control system according to claim 7, wherein said further switch means includes an actuating member, said actuating member being operatively connected with said means for selectively engaging and disengaging said separating clutch means, and wherein said further switch means is adjustable with respect to said actuating member in order to match the two parts properly for correct operation of the control system.

References Cited in the file of this patent

UNITED STATES PATENTS

| | | |
|---|---|---|
| 1,541,240 | Barkiej | June 9, 1925 |
| 1,960,705 | Kochling | May 29, 1934 |
| 2,104,608 | Cox et al. | Jan. 4, 1938 |
| 2,226,802 | Black | Dec. 31, 1940 |
| 2,427,653 | Banker | Sept. 23, 1947 |
| 2,449,586 | Carnagua | Sept. 21, 1948 |
| 2,894,609 | Tattersall | July 14, 1959 |
| 2,937,543 | Forster | May 24, 1960 |
| 2,949,047 | Burckhardt | Aug. 16, 1960 |
| 2,956,449 | Foerster | Oct. 18, 1960 |